Aug. 1, 1967  A. ZIMMERMANN ET AL  3,333,679
DEVICE FOR CLOSING THE OUTLET END OF A WORM CONVEYER
Filed July 7, 1965
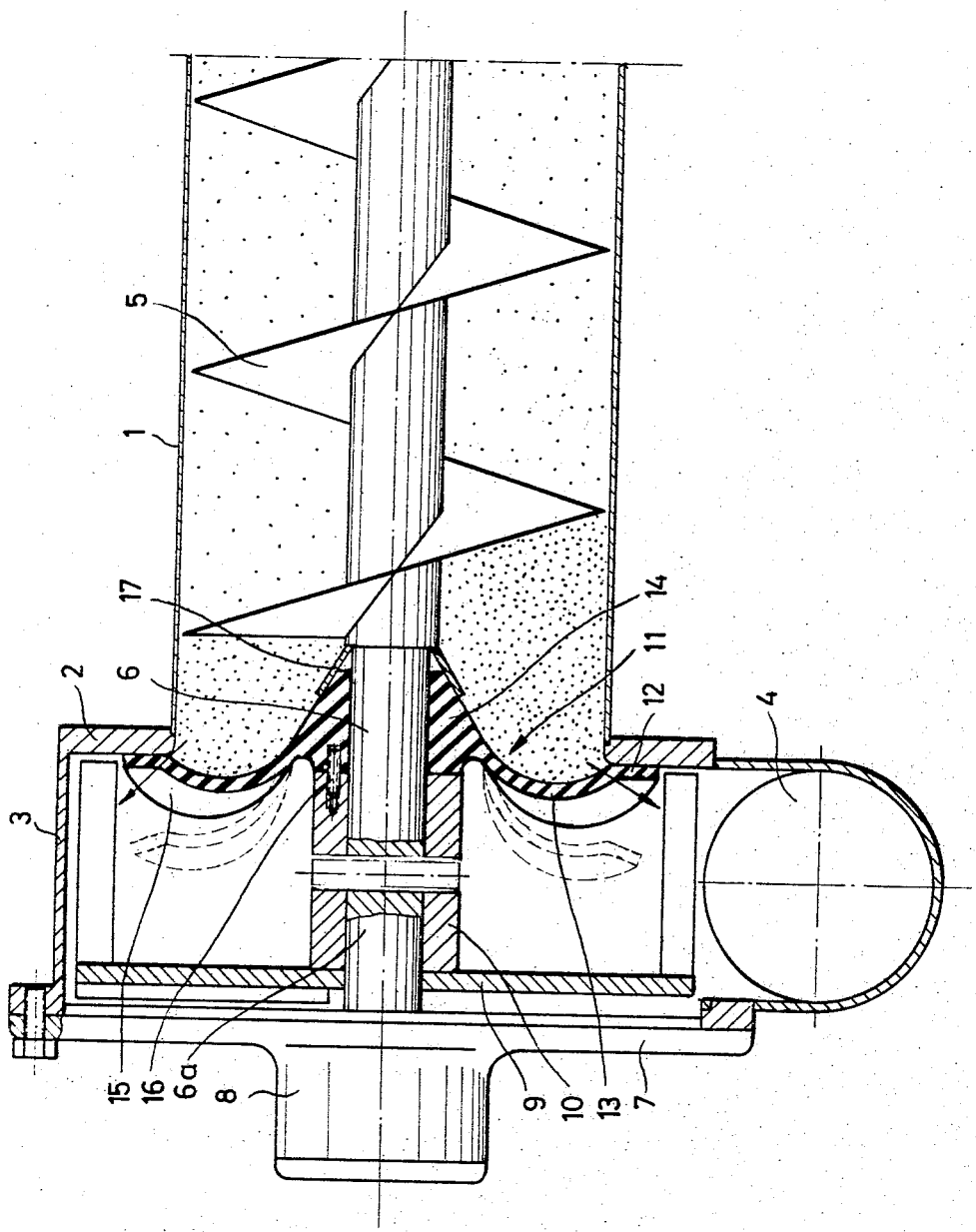
INVENTORS
Adolf Zimmermann
BY Adolf Lesk
Dicke + Craig
ATTORNEYS

United States Patent Office 3,333,679
Patented Aug. 1, 1967

3,333,679
DEVICE FOR CLOSING THE OUTLET END OF A WORM CONVEYER
Adolf Zimmermann and Adolf Lesk, Osterburken, Baden, Germany, assignors to Adolf Zimmermann, Maschinenbau, Osterburken, Baden, Germany, a firm
Filed July 7, 1965, Ser. No. 470,132
Claims priority, application Germany, July 8, 1964, Z 10,961
16 Claims. (Cl. 198—217)

The present invention relates to a device for axially closing the outlet end of the pipe of a worm conveyer which is employed for passing a bulk material from one area in which a certain pressure prevails to another area in which a different pressure prevails, and wherein this device comprises a plate-shaped valve element which produces a back pressure upon the bulk material at the outlet end of the conveyer pipe, whereby a sealing plug is formed of the material within this outlet end.

In worm conveyers which are intended for passing a bulk material from an area or a conveyor section containing a lower pressure into an area or conveyer section containing a higher pressure, it is necessary to provide the outlet end of the pipe containing the conveyer screw with suitable means which prevent an equalization of pressure to occur between the two areas or sections in a manner similar to a floodgate. This is conventionally done by providing the end of the conveyer pipe with a valve element which is adapted to open under the pressure of the bulk material which is conveyed by the worm conveyer and which automatically closes when the conveyer screw no longer feeds any material or only an insufficient amount thereof. This valve element causes the bulk material to be compressed within the end of the conveyer pipe so as to form a plug of a sufficient density to prevent the occurrence of a pressure balance between the two areas or to keep the loss in pressure within admissible limits.

This valve element consists according to one prior design of a rigid plate which is pivotably mounted above the end of the conveyer pipe and is acted upon by a weight. Another known device likewise comprises a rigid plate which is slidable in the axial direction against the action of a spring and is adapted to open the end of the conveyer pipe under the pressure of the material which is conveyed by the conveyer screw and to close this end when the pressure of the material decreases. Both of these prior devices have the disadvantage that, when the operation of the worm conveyer is being stopped and the valve plate therefore tends to close the mouth of the conveyer pipe, parts of the bulk material may be clamped between the circular sealing surface of the valve plate and the end of the conveyer pipe and may thus prevent this plate from sealing the end of the conveyer pipe tightly.

There is still another known device in which the worm conveyer is closed by means of a check valve which comprises an elastic ring surrounding the mouth of the conveyer pipe, and a conical valve member which is acted upon by a spring. Since this device is of a rather complicated construction and consists of a considerable number of elements, it is very susceptible to trouble and therefore unreliable in operation.

It is an object of the present invention to provide an improved device of the type as mentioned in the beginning for axially closing and sealing the outlet end of the pipe of a worm conveyer through which a bulk material may be passed from one area or conveyer section in which a certain pressure pravails to another area or conveyer section in which a different, and preferably a higher pressure prevails, and wherein this device comprises a valve plate which produces a back pressure upon the bulk material at the outlet end of the conveyer pipe, whereby a sealing plug is formed of the material at this outlet end. Another object of the invention is to design this valve plate in a manner so that it will effect a tight and reliable closure of the outlet end of the conveyer pipe whenever necessary during the operation of the conveyer as well as when the conveyer is stopped. A further object of the invention is to design this valve plate in a manner so that during the operation of the conveyer it will produce only a small back pressure in opposition to the conveying pressure of the bulk material.

According to this invention, these objects will be attained by mounting the valve plate in a position coaxially to the open end of the conveyer pipe and so that its center is rigidly secured against a movement in the axial direction, by designing it in a manner so that, when the conveyer is stopped or when the conveying pressure of the bulk material is low, the annular outer edge surface of the valve plate will tightly engage upon an annular flange on the outlet end of the conveyer pipe, and by making the valve plate of an elastic material which is capable of yielding in the axial direction under the conveying pressure of the bulk material and will thereby form an annular gap through which the material may pass from the end of the conveyer pipe in radial directions into the further part of the conveyer.

The particular design and structure of the closure device according to the invention has several important advantages. Due to the elasticity of the valve plate, it is no longer necessary to provide several parts which are movable relative to each other and are often the cause of operating failures. According to the invention, the movements which are necessary for opening and closing the outlet end of the conveyer pipe are produced solely by the elasticity of the material of the valve plate in association with the conveying pressure of the bulk material and the higher back pressure in the chamber at the rear side of the valve plate. A further advantage consists in the ability of the elastic valve plate to adapt itself automatically at any point of its circular sealing surface to the prevailing pressure of the bulk material and to seal the mouth of the conveyer pipe tightly also at such points through which no material or only a small amount penetrates. Furthermore, when the conveyer is stopped, a perfect sealing action will also be attained. Any residues of the bulk material or foreign substances which might be clamped between the mouth of the conveyer pipe and the valve plate will not interfere with such a tight sealing action since the elastic valve plate will adapt itself to any uneven surfaces. It is therefore possible to stop the conveyer in a filled or partly filled condition without danger that the sealing action between the two conveyer sections may suffer and that a loss of pressure might occur in the conveyer section following the valve plate or even an equalization of pressure between the two conveyer sections.

According to one preferred embodiment of the invention, the elastic valve plate is made of a curved annular trough-shape around its central mounting part, and it is mounted coaxially to the outlet end of the conveyer pipe in a position so that its convex side faces the conveyer section which contains the higher pressure. This has especially the advantage that, when the conveyer screw is empty so that no plug of the bulk material can be formed at the end of the conveyer pipe, the elastic valve plate will not be forced into the conveyer pipe in which a lower pressure prevails.

For conveying apparatus in which a higher pressure difference is to be expected between the conveyer pipe and the subsequent section, it is for the same reason advisable to provide the elastic valve plate with elastic reinforcing means. In order to prevent the elasticity of the outer annular sealing surface of the valve plate from being impaired by these reinforcing means, they are preferably provided so as to extend in radial directions on the valve plate. These reinforcing means may consist of reinforcing ribs of the same material as that of the valve plate and may preferably be molded integrally therewith, or they may consist of a spring metal, for example, steel, and may either be embedded in the valve plate while it is being molded or they may be connected to the outside thereof at one or the other side. Such a metallic reinforcement may, for example, be star-shaped so that its radial arms engage upon the concave side of the elastic valve plate and it may have a convex curvature in accordance with the shape of the valve plate, as seen in the direction toward the area for conveyer section containing the higher pressure.

The valve plate may be nonrotatably connected to a short shaft which is rotatably mounted within an end bearing and extends coaxially to, and within geometrical extension of the shaft carrying the conveyer screw. This short shaft carrying the valve plate may be either a separate structural element or, according to a preferred embodiment of the invention, it may form the butt end of the shaft carrying the conveyer screw which projects from the end of the conveyer pipe and is mounted in an end bearing. In this event, the valve plate is turned synchronously with the conveyer screw which facilitates the discharge of the bulk material through the annular gap which is formed during the operation of the conveyer between the outer annular edge portion of the valve plate and the flange on the end of the conveyer pipe.

The central mounting part of the elastic valve plate which serves for securing the plate to the short shaft or to the butt end of the conveyer shaft is preferably in the form of a frusto-conical part which projects and converges from the concave annular cup-shaped surface in the direction toward the conveyer screw. This particular shape of the elastic valve plate effects and facilitates th deflection of the bulk material from its movement in the axial direction of the conveyer pipe to the radial direction toward the annular gap between the outer annular surface of the valve plate and the flange on the end of the conveyer pipe.

The inventive design of tht central mounting part of the valve plate in the form of a frustum also serves for attaining a further object. Experiments have shown that, when the pressures in the conveyer pipe and the area or conveyer section into which the bulk material is to be conveyed differ considerably from each other and when therefore a high back pressure acts upon the valve plate in the direction toward the conveyer screw, it is very difficult to prevent a displacement of the valve plate in the axial direction. Such a displacement cannot be prevented by providing the conveyer shaft with a flange of such a large diameter that it could serve as a thrust bearing for the valve plate since such a flange would seriously interfere with the conveying movement of the bulk material. An additional feature of the invention for overcoming this disadvantage in association with the feature of the frusto-conical shape of the central mounting part of the valve plate consists in providing a conical tubular bracing member which is secured to the conveyer shaft directly behind the end of the conveyer screw, as seen in the conveying direction, and diverges in the direction toward the end of the conveyer pipe. The inner side of this conical bracing member is disposed at substantially the same angle to the axis of the conveyer shaft as the conical outer surface of the frustum and the open end of this member has a larger inner diameter than the adjacent circular end surface of the frustum. Therefore, the frustum partly engages into the bracing member and against the inner wall thereof. If a high pressure acts upon the valve plate in the direction toward the conveyer screw, the frusto-conical mounting part of the valve plate is pressed against the conical bracing member which thus takes up the axial thrust of the mounting part.

For guiding the bulk material in the proper direction toward the mouth of the conveyer pipe, it may be advisable to provide several fixed guide elements such as vanes or the like within the end of the pipe adjacent to the part in which the material is compressed into a plug.

The elastic valve plate may be molded entirely of vulcanized natural or synthetic rubber or of a suitable rubber-like plastic.

The above-mentioned as well as additional features and advantages of the present invention will become more clearly apparent from the following detail description thereof which is to be read with reference to the accompanying drawing which shows partly a longitudinal section and partly a side view of the outlet end of a worm conveyer and of one preferred embodiment of the closure device according to the invention.

As illustrated in the drawing, the outlet end of the conveyer pipe 1 is provided with an annular flange 2 which is welded to a short cylindrical housing 3. This housing is connected to a conveyer pipe 4 which leads to further parts of conveying apparatus. The conveyer screw 5 which is rotatable in the conveyer pipe 1 and mounted on a shaft 6 which extends through the entire length of pipe 1 terminates at a short distance from the end of this pipe so as to form a space in which a plug may be formed of the bulk material which is being conveyed. The butt end 6a of the conveyer shaft which extends beyond the conveyer screw 5 projects from tht end of the conveyer pipe 1 and through the cylinder housing 3, and it is mounted in an end bearing 8 on the outer side of the end wall 7 of housing 3. This housing 3 encloses a chamber which contains a conveyer wheel 9 which by means of its hub 10 is rigidly connected to the shaft butt 6a. Between the end of this hub 10 and in the end of the conveyer screw 5, that is, within the outlet end of the conveyer pipe 1 in which the plug is to be formed, the conveyer shaft further carries an elastic valve plate 11 of rubber or an elastic plastic which substantially consists of an annular curved cup-shaped part 13, an annular outer flange 12, and a central frusto-conical mounting part 14 which is tapered toward the end of the conveyer screw 5. The annular curved part 13 is provided on its convex outer side with reinforcing ribs 15 which are molded integrally thereon. Valve plate 11 is nonrotatably connected to the conveyer shaft 6 by means of a locking pin 16, one end of which is screwed into the hub 10, while its other end engages into a bore in the mounting part 14. The end of conveyer screw 5 carries a conical bracing member 17 of sheet metal which is rigidly secured thereto and diverges in the direction toward the outlet end of conveyer pipe 1. This conical bracing member 17 projects over the end surface of the mounting part 14 and its inner surface engages for a certain distance upon the conical outer surface of this part 14.

The manner of operation of the conveyer and the sealing device according to the invention is as follows:

The bulk material which is inserted into the conveyer pipe 1 is fed by the conveyer screw 5 in the direction toward the chamber which is enclosed by the housing 3 and from which the material is then further conveyed by the conveyer wheel 9 into the conveyer pipe 4. The elastic valve plate 11 is adapted to seal the conveyer pipe 1 relative to the chamber in housing 3 in which a higher pressure prevails, and when the conveyer is not in operation, valve plate 11 prevents an equalization of pressure between the two sections of the conveyer by the tight engagement of its outer flange surface 12 with the flange 2 on the end of pipe 1. The convex shape of the annular trough-shaped part 13 of valve plate 11 and the reinforcing ribs 15 on the rear side thereof prevent the valve plate from being bent in the direction toward the conveyer pipe 1, even if there is considerable difference in pressure between the two conveyer sections. The axial thrust which is exerted by valve plate 11 in the direction toward the conveyer pipe 1 when the pressure in housing 3 is considerably higher than in pipe 1 is taken up by the conical bracing member 17 into which the frusto-conical mounting part 14 will then be pressed.

When the conveyer is in operation, the material within the end of the conveyer pipe 1 will be compressed into the form of a plug by the action of the conveying pressure which is produced by the conveying screw, by the back pressure which is exerted by the elastic valve plate 11, and by the higher pressure upon this plate in the chamber in housing 3 which must be overcome by the conveying pressure of the conveying screw in order to pass the material from the conveying pipe 1 into the chamber in housing 3. While being continuously renewed by the following bulk material which is fed by the conveyer screw 5 through the pipe 1, the plug is pushed forwardly and against the elastic valve plate 11 which yields under this pressure and thereby opens an annular gap between its outer flange part 12 and the flange 2 on the end of pipe 1, as indicated in the drawing in dotted lines, through which the bulk material can then enter into the chamber in housing 3. The elasticity of valve plate 11 insures that it will adapt itself to the different quantities of bulk material passing through the annular gap at different points of its circumference and that its sealing action will therefore be equally effective at any point of its circumference.

The direction of the conveying movement of the individual particles of the bulk material is a resultant of a force component which prevails generally in the axial direction and of a force component which acts in the peripheral direction. These components vary in accordance with the particular positions of the particles within the conveyer and the particular type of the bulk material. With some types of bulk materials it may occur under certain operating conditions and under the influence of the back pressure in the axial direction that the component acting in the peripheral direction will predominate so that especially within the area adjacent to the end of the conveyer pipe 1 a strongly circulating movement will occur which may result in a considerable increase in temperature of the bulk material. This disadvantage may be overcome by providing the end of the conveyer pipe 1 with suitable guide means, such as stationary vanes or the like, as indicated in the drawing.

Although my invention has been illustrated and described with reference to the preferred embodiment thereof, I wish to have it understood that it is in no way limited to the details of such embodiment but is capable of numerous modifications within the scope of the appended claims.

Having thus fully disclosed our invention, what we claim is:

1. A sealing screw conveyer, comprising: a generally tubular conveyer pipe means for receiving bulk material and having opposite inlet and outlet ends connected to areas of materially different pressures; conveyer screw means operatively rotationally mounted within said pipe means for axially conveying bulk material toward only the outlet end of said pipe upon rotation in one direction; a generally radially extending annular sealing surface on said pipe means around the periphery of said outlet end; and highly elastic flexible valve plate means completely covering said outlet end of said pipe and having a generally radially extending annular sealing surface biased in face to face sealing contact with said pipe means sealing surface, and for forming a normally closed predetermined pressure opening valve and for guiding the discharge of bulk material generally radially between said sealing surfaces when open.

2. The device of claim 1, including means mounting said plate means on said screw means for rotation therewith and for producing a wiping seal enhancing engagement between said sealing surfaces.

3. The device of claim 2, including housing means enclosing said outlet end of said pipe means for receiving the bulk material discharged past said plate means and having a radial outlet; an outlet end radial bearing mounted on said housing means; and said screw means having a shaft extending through said plate means into said bearing.

4. The device of claim 1, including housing means enclosing said outlet end of said pipe means for receiving the bulk material discharged past said plate means and having a radial outlet; an outlet end radial bearing mounted on said housing means; and said screw means having a shaft extending through said plate means into said bearing.

5. The device of claim 4, including said plate means having a cup-shaped portion convexly facing said inlet end and an outer radially extending annular flange forming said plate means sealing surface.

6. The device of claim 5, including said plate means having a central reinforced hub portion mounted on said shaft and conically tapered inwardly toward said inlet end to guide the bulk material radially toward said sealing surfaces.

7. The device of claim 6, including said screw means having bracing means conically tapered inwardly toward said inlet end mounted over and about the smaller diameter portion of said hub portion for bracing said hub portion and preventing bulk material from entering the area between said hub portion and said shaft.

8. The device of claim 7, including means mounting said plate means on said screw means for rotation therewith and for producing a wiping seal enhancing engagement between said sealing surfaces.

9. In a combination with a worm conveyer having a conveyer pipe and a shaft with a conveyer screw thereon extending coaxially to and rotatable within said pipe for conveying a bulk material through said pipe and then from the outlet end thereof to an area containing a pressure different from the pressure in said pipe, an annular outwardly projecting flange on the end of said outlet, and a device for closing and sealing said outlet relative to said area and for producing a back pressure upon said material for thereby compressing said material within said outlet so as to form therein a sealing plug of said material, said device comprising a substantially circular valve plate of an elastic material disposed coaxially to said outlet end and having a relatively solid central part and a more flexible outer part with an outer edge portion on said outer part forming an annular sealing surface on the outer side of said outer part adapted to engage tightly upon said flange when said conveyer is stopped, said flexible outer part including said edge portion forming said sealing surface being capable of yielding in the axial direction under the conveying pressure of said material so as to form an annular gap between said sealing surface and said flange, means for mounting said central part of said valve plate so as to be substantially immovable in said axial direction but rotatably coaxially to said shaft, and elastic reinforcing ribs radially projecting from said central part on the convex side of said outer part of said valve plate facing said area adapted to contain a higher pressure than said conveyer pipe.

10. The combination as defined in claim 9, in which said reinforcing ribs consist of the same material as and are integral with said valve plate.

11. In combination with a worm conveyer having a conveyer pipe and a shaft with a conveyer screw thereon extending coaxially to and rotatable within said pipe for conveying a bulky material through said pipe and then from the outlet end thereof to an area containing a pressure different from the pressure in said pipe, an annular outwardly projecting flange on the end of said outlet, and a device for closing and sealing said outlet relative to said area and for producing a back pressure upon said material for thereby compressing said material within said outlet so as to form therein a sealing plug of said material, said device comprising a substantially circular valve plate of an elastic material disposed coaxially to said outlet end and having a relatively solid central part and a more flexible outer part with an outer edge portion on said outer part forming an annular sealing surface on the outer side of said outer part adapted to engage tightly upon said flange when said conveyer is stopped, said flexible outer part including said edge portion forming said sealing surface being capable of yielding in the axial direction under the conveying pressure of said material so as to form an annular gap between said sealing surface and said flange, means for mounting said central part of said valve plate so as to be substantially immovable in said axial direction but rotatable coaxially to said shaft, elastic reinforcing means on said outer part of said valve plate, and said elastic reinforcing means consist of arms of spring steel projecting radially from said central part toward the outside of said valve plate.

12. In combination with a worm conveyer having a conveyer pipe and a shaft with a conveyer screw thereon extending coaxially to and rotatable within said pipe for conveying a bulk material through said pipe and then from the outlet end thereof to an area containing a pressure different from the pressure in said pipe, an annular outwardly projecting flange on the end of said outlet, and a device for closing and sealing said outlet relative to said area and for producing a back pressure upon said material for thereby compressing said material within said outlet so as to form therein a sealing plug of said material, said device comprising a substantially circular valve plate of an elastic material disposed coaxially to said outlet end and having a relatively solid central part and a more flexible outer part with an outer edge portion on said outer part forming a annular sealing surface on the outer side of said outer part adapted to engage tightly upon said flange when said conveyer is stopped, said flexible outer part including said edge portion forming said sealing surface being capable of yielding in the axial direction under the conveying pressure of said material so as to form an annular gap between said sealing surface and said flange, means for mounting said central part of said valve plate so as to be substantially immovable in said axial direction, but rotatable coaxially to said shaft, elastic reinforcing means on said outer part of said valve plate, and said elastic reinforcing means consist of a star-shaped member having arms radially projecting from said central part and having a convex curvature in accordance with the curvature of said outer part of said valve plate and engaging upon the concave side of said valve plate facing said conveyer pipe adapted to contain a lower pressure than said area at the other side of said plate.

13. In combination with a worm conveyer having a conveyer pipe and a shaft with a conveyer screw thereon extending coaxially to and rotatable within said pipe for conveying a bulk material through said pipe and then from the outlet end thereof to an area containing a pressure different from the pressure in said pipe, an annular outwardly projecting flange on the end of said outlet, and a device for closing and sealing said outlet relative to said area and for producing a back pressure upon said material for thereby compressing said material within said outlet so as to form therein a sealing plug of said material, said device comprising a substantially circular valve plate of an elastic material disposed coaxially to said outlet end and having a relatively solid central part and a more flexible outer part with an outer edge portion on said outer part forming an annular sealing surface on the outer side of said outer part adapted to engage tightly upon said flange when said conveyer is stopped, said flexible outer part including said edge portion forming said sealing surface being capable of yielding in the axial direction under the conveying pressure of said material so as to form an annular gap between said sealing surface and said flange, means for mounting said central part of said valve plate so as to be substantially immovable in said direction but rotatably coaxially to said shaft, and said means for mounting said central part of said valve plate comprising a thrust bearing, and a short shaft rotatably mounted in said bearing and extending coaxially to and within a geometrical extension of said conveyer shaft, said central part of said valve plate being secured to said short shaft.

14. In combination with a worm conveyer having a conveyer pipe and a shaft with a conveyer screw thereon extending coaxially to and rotatable within said pipe for conveying a bulk material through said pipe and then from the outlet end thereof to an area containing a pressure different from the pressure in said pipe, an annular outwardly projecting flange on the end of said outlet, and a device for closing and sealing said outlet relative to said area and for producing a back pressure upon said material for thereby compressing said material within said outlet so as to form therein a sealing plug of said material, said device comprising a substantially circular valve plate of an elastic material disposed coaxially to said outlet end and having a relatively solid central part and a more flexible outer part with an outer edge portion on said outer part forming an annular sealing surface on the outer side of said outer part adapted to engage tightly upon said flange when said conveyer is stopped, said flexible outer part including said edge portion forming said sealing surface being capable of yielding in the axial direction under the conveying pressure of said material so as to form an annular gap between said sealing surface and said flange, means for mounting said central part of said valve plate so as to be substantially immovable in said axial direction but rotatable coaxially to said shaft, and said means for mounting said central part of said valve plate comprise a butt end of said conveyer shaft projecting from the end of said conveyer screw and from the end of said conveyer pipe, and means for rotatably mounting said butt end at a point spaced from the end of said conveyer pipe.

15. In combination with a worm conveyer having a conveyer pipe and a shaft with a conveyer screw thereon extending coaxially to and rotatable within said pipe for conveying a bulk material through said pipe and then from the outlet end thereof to an area containing a pressure different from the pressure in said pipe, an annular outwardly projecting flange on the end of said outlet, and a device for closing and sealing said outlet relative to said area and for producing a back pressure upon said material for thereby compressing said material within said outlet so as to form therein a sealing plug of said material, said device comprising a substantially circular valve plate of an elastic material disposed coaxially to said outlet end and having a relatively solid central part and a more flexible outer part with an outer edge portion on said outer part forming an annular sealing surface on the outer side of said outer part adapted to engage tightly upon said flange when said conveyer is stopped said flexible outer part including said edge portion forming said sealing surface being capable of yielding in the axial direction under the conveying pressure of said material so as to form an annular gap between said sealing surface and said flange, means for mounting said central part of said valve plate so as to be substantially immovable in said axial direction but rotatable coaxially to said shaft, said central part of said valve plate consists of a frustoconical part converging from the concave surface of said plate toward the end of said conveyer screw for deflecting said bulk material from its axial direction of the conveying movement toward radial directions, and a conical tubular bracing member secured to said conveyer shaft adjacent to the end of said conveyer screw and diverging toward the end of said conveyer pipe and projecting over the circular end surface of the frustum of said central part and engaging over and upon a part of the conical outer surface of said frustum.

16. In combination with a worm conveyer having a conveyer pipe and a shaft with a conveyer screw thereon extending coaxially to and rotatable within said pipe for conveying a bulk material through said pipe and then from the outlet end thereof to an area containing a pressure different from the pressure in said pipe, an annular outwardly projecting flange on the end of said outlet, and a device for closing and sealing said outlet relative to said area and for producing a back pressure upon said material for thereby compressing said material within said outlet so as to form therein a sealing plug of said material, said device comprising a substantially circular valve plate of an elastic material disposed coaxially to said outlet end and having a relatively solid central part and a more flexible outer part with an outer edge portion on said outer part forming an annular sealing surface on the outer side of said outer part adapted to engage tightly upon said flange when said conveyer is stopped, said flexible outer part including said edge portion forming said sealing surface being capable of yielding in the axial direction under the conveying pressure of said material so as to form an annular gap between said sealing surface and said flange, means for mounting said central part of said valve plate so as to be substantially immovable in said axial direction but rotatable coaxially to said shaft, and stationary guide means on the inner side and near the end of said conveyer pipe for guiding said bulk material in the proper direction toward said end.

References Cited
UNITED STATES PATENTS

| | | | |
|---|---|---|---|
| 2,699,272 | 1/1955 | Barth | 222—413 |
| 3,059,759 | 10/1962 | Heitshu | 198—213 |

EVON C. BLUNK, *Primary Examiner.*

A. C. HODGSON, *Assistant Examiner.*